(12) United States Patent
Ekström et al.

(10) Patent No.: US 8,041,837 B2
(45) Date of Patent: Oct. 18, 2011

(54) METHOD AND DEVICES FOR FILTERING DATA PACKETS IN A TRANSMISSION

(75) Inventors: Hannes Ekström, Stockholm (SE); Reiner Ludwig, Hürtgenwald (DE); Per Willars, Vaxholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 577 days.

(21) Appl. No.: 12/160,545

(22) PCT Filed: Jan. 10, 2006

(86) PCT No.: PCT/EP2006/000148
§ 371 (c)(1),
(2), (4) Date: Oct. 17, 2008

(87) PCT Pub. No.: WO2007/079773
PCT Pub. Date: Jul. 19, 2007

(65) Prior Publication Data
US 2011/0035495 A1    Feb. 10, 2011

(51) Int. Cl.
*G06F 15/16* (2006.01)
(52) U.S. Cl. .......................... 709/246; 709/227; 709/228
(58) Field of Classification Search .......... 709/227–229, 709/246
See application file for complete search history.

(56) References Cited

U.S. PATENT DOCUMENTS

| | | | | |
|---|---|---|---|---|
| 6,266,695 | B1 * | 7/2001 | Huang et al. | 709/223 |
| 6,714,515 | B1 * | 3/2004 | Marchand | 370/231 |
| 6,765,912 | B1 * | 7/2004 | Vuong | 370/395.2 |

(Continued)

FOREIGN PATENT DOCUMENTS

WO    WO0076230    12/2000

(Continued)

OTHER PUBLICATIONS

K. Nichols, et al.; Definition of the Differentiated Services Field (DS Field) in the IPv4 and IPv6 Headers, The Internet Society (Dec. 1998).

(Continued)

*Primary Examiner* — Hussein A. Elchanti

(57) ABSTRACT

A method for associating a data packet (DP) with a packet bearer (PB) in a user equipment (UE1) of a communication network is proposed. The packet bearer (PB) transmits the data packet to a communication entity in the communication network. The communication network comprises at least one control entity to exchange signaling information with the user equipment. The user equipment comprises at least one executing unit for executing one or more applications which create the data packet, a packet marking entity for marking at least one control field in the data packet and a transmission unit for sending the data packet on the packet bearer. After setting up the packet bearer between the transmission unit and the communication entity, a first signaling of filter parameters for defining a packet filter is received by the user equipment. The filter parameters correspond to a packet marking. A second signaling of the packet marking from the control entity is received by the user equipment and forwarded to the packet marking entity. The data packet is marked with the signaled packet marking. The packet filter corresponding to the filter parameters is established for scanning data packets forwarded from the executing unit to the transmission unit and is associated with the packet bearer. The data packet with the marking corresponding to the filter parameters is forwarded on the associated packet bearer. A corresponding mobile network, control entity, user equipment and computer program are also described.

15 Claims, 7 Drawing Sheets

U.S. PATENT DOCUMENTS

| | | | | |
|---|---|---|---|---|
| 6,785,510 B2 * | 8/2004 | Larsen | ............................ | 455/11.1 |
| 6,816,912 B1 * | 11/2004 | Borella et al. | ................. | 709/238 |
| 6,892,389 B1 * | 5/2005 | Dekeyser | ........................ | 725/120 |
| 6,925,075 B2 * | 8/2005 | Karagiannis | ................... | 370/338 |
| 6,948,076 B2 * | 9/2005 | Saito | ................................ | 726/12 |
| 6,980,801 B1 * | 12/2005 | Soininen et al. | ............ | 455/435.1 |
| 2002/0091760 A1 * | 7/2002 | Rozen | ............................ | 709/203 |
| 2003/0088675 A1 * | 5/2003 | Zheng | ............................ | 709/227 |

FOREIGN PATENT DOCUMENTS

| | | |
|---|---|---|
| WO | WO2004051941 | 6/2004 |

OTHER PUBLICATIONS $3^{rd}$ Generation Partnership Project; Technical Specification Group Services and System Aspects; Quality of Service (QoS) concept and architecture (Release 6), 3GPP Organizational Partners (ARIB, ATIS, CCSA, ETSI, TTA, TTC).

* cited by examiner

METHOD AND DEVICES FOR FILTERING DATA PACKETS IN A TRANSMISSION

TECHNICAL FIELD OF THE INVENTION

The present invention relates to a method for associating a data packet with a packet bearer in a user equipment of a communication network. Devices and software programs embodying the invention are also described.

BACKGROUND OF THE INVENTION

In many cases, data packets need to be sent over a communication network between a user equipment and another entity. Transmissions can be performed both in downlink and uplink direction and the other entity is often another user equipment, e.g. in a telephone call. The other entity may also be service entity like a server which may send different packet flows for sound and video to the user equipment, e.g. in a streaming session, while the user equipment may send data to the service entity to initiate the streaming session by control signaling. The other entity may either be part of the communication network or it is able to exchange data packets with the network.

The communication network can be a fixed or a mobile network. More than one network can be involved in the transmission, e.g. if the user equipment is located in a mobile network which is interfacing directly or via intermediate networks to a fixed network in which the other entity is located. Customary mobile networks comprise a core network with core network nodes, e.g. a serving general packet radio service support node (SGSN) or a gateway general packet radio service support node (GGSN). The core network nodes allow the exchange of data with external networks such as the Internet or mobile or fixed networks of other operators. Furthermore, customary mobile networks comprise one or more access networks with access network nodes for controlling the radio transmission to user equipment, commonly designated, e.g., as base station controllers, radio network controllers (RNC), Node B or base transceiver stations. Other implementations of the nodes and networks have been proposed, for example an enhanced GSN and an enhanced RNC which perform different parts of the SGSN functionality and thus allow omitting an SGSN.

Depending on the type of packet traffic, the requirements for the transmission differ significantly. For example, voice transmission requires low delay and jitter while a limited amount of errors can be acceptable. Streaming sessions using packet buffers typically allow higher delays and jitter and the receiver can generally also correct or hide errors. File transfer can often be performed as best-effort traffic but normally requires error-free data. In addition, operators may choose to offer different qualities of service (QoS) depending on the user subscription, i.e. they may choose to perform user differentiation. Accordingly, the provision of a defined quality of service is an important concept in the control of data traffic as described for example in technical specification 3GPP 23.107 V 6.3.0. of the $3^{rd}$ Generation Partnership Project "Quality of Service (QoS) concept and architecture".

Different contexts define the quality of service relating to a data transmission involving nodes of a communication network and the user equipment. The user equipment and a core network node negotiate a PDP (Packet Data Protocol) context which specifies parameters for the transmission of data packets to and from the user equipment. In addition, further contexts are set up for different links between the service entity and the user equipment, e.g. a radio bearer between an access node and a user equipment, which specifies the transmission parameters on the radio link. Packet flows between the service entity and the user equipment are then mapped to these contexts and forwarded accordingly.

Current 3GPP standards define a mechanism to map downlink data to a packet bearer. For this purpose, the bearer is associated with a PDP context. The PDP context is the granularity with which QoS can be provided, i.e. different PDP contexts can provide a different QoS. The mapping of packets onto PDP contexts is done in an edge node of the communication network, e.g. in the GGSN using downlink Traffic Flow Templates (TFT). A TFT is a packet filter which defines rules that uniquely map incoming data packets onto a PDP context. The downlink TFT is part of the PDP context definition and can be configured to operate on a number of different parameters. For example, the IP source address of a data packet or the "Type of Service"-field (ToS) in the IP-header can be used to map packets onto a PDP context. The Session Management (SM) protocol is used to manage PDP Contexts.

In the uplink, the user equipment requires information how to map data packets from an application to a bearer or to the associated context. However, this is not in the scope of the current 3GPP standards. This functionality is defined proprietarily and can differ between vendors of user equipment. In one implementation, the user equipment has several PDP context templates, each with a different associated QoS. A connection manager provides a mapping for each application to one of the PDP context templates. This mapping is a static configuration which creates a binding in the connection manager and which is signaled to the user equipment, e.g. by an SMS. Typically, the user performs the configuration by visiting the web-site of an operator and entering the phone model he is using and which application he wants to configure, e.g. WAP or MMS. Upon initiation of a session, e.g., when making a call, the application communicates to the connection manager through a proprietary API (Application Programming Interface). The connection manager associates the data packets from the application with the configured PDP context and, if required, sets up the context. Correspondingly, there is a static binding between application and PDP context template. The identifiers and formats used in the configuration are specific for each vendor.

As a result, the existing methods for associating data packets with a bearer are inflexible and do not allow dynamic changes of the configuration. A further problem is that application development is both access specific and vendor specific, i.e. applications must be written for a specific access (e.g. 3GPP) and a particular vendor of user equipment because the QoS API in the above binding mechanism may differ for both vendor and access.

Furthermore, user equipment according to 3GPP specifications may consist of two entities, a terminal equipment (TE) and a mobile terminal (MT) which are logically and optionally also physically distinct. Applications are executed in the terminal equipment and data packets are exchanged over the mobile terminal with the mobile network. In the state of the art, an interface between TE and MT would be required over which it is possible to convey the bearer requirements of the application. As the binding of application and context is vendor specific in present user equipment, different interfaces would be required. If the terminal equipment is for example a personal computer and the terminal a mobile network card, the computer may need to support different interfaces for different card vendors, leading to high complexity and cost.

For transmissions in an IP network, the differentiated services concept has been proposed. The differentiated services concept is described for example in the Request for Comments 2474 "Definition of the Differentiated Services Field (DS Field) in the IPv4 and IPv6 Headers" of the Internet Engineering Task Force. The concept designates a data field in the header of a data packet in different versions of the Internet Protocol (IP). The value of the data field specifies which quality of service should be used when handling the packet. This value is commonly designated as Differentiated Services Code Point (DSCP).

SUMMARY

With this background, it is an object of the present invention to propose a simple and flexible method for associating data packets with a bearer.

According to the invention, the method described in claim 1 is performed. Furthermore, the invention is embodied in a communication network, a control entity, a user equipment, and a computer program as described in the other independent claims. Advantageous embodiments are described in the dependent claims.

The proposed method associates a data packet with a packet bearer in a user equipment of a communication network. The user equipment comprises at least one executing unit for executing one or more applications which create the data packet. The packet bearer is adapted to transmit the data packet to a communication entity in the communication network. Typically, a plurality of data packets is created and transmitted on the bearer. The communication entity may be another terminal in the communication network, e.g. another user equipment or a server. Alternatively, the communication entity is an edge node of the communication network which forwards the data packet to a further communication network.

Generally, the data packet is processed before the transmission is performed, for example by a stack of protocol layers in the user equipment. Examples of such processing are a split or concatenation of the data packets; headers or checking fields may be added. A user equipment for the proposed method comprises also a packet marking entity for marking at least one control field in the data packet. Many protocols specify a packet header with a control field in which a marking can be applied. A transmission unit is adapted to send the data packet on the packet bearer.

For the transmission of the data packet, a packet bearer is set up between the transmission unit and the communication entity. In many cases, a bearer set up for the transmission of previous data packets can be used, i.e. it is not necessary to set up a specific bearer for the data packets of an application if a suitable bearer has been set up before. The bearer can be set up at any point in time before the data packet is transmitted.

For associating the data packet with the packet bearer, a first signaling is performed and received by the user equipment. In the first signaling, filter parameters for defining a packet filter are sent to the user equipment. The filter parameters correspond to a packet marking, i.e. the filter scans data packets if they comprise the signaled marking. The packet filter corresponding to the filter parameters is established for scanning data packets forwarded from the executing unit to the transmission unit. Those data packets corresponding to the filter parameters are forwarded to the bearer associated with the packet filter. A plurality of packet filters can be established simultaneously in the user equipment for associating data packets with different bearers. Different packet filters can be associated with the same packet bearer.

The communication network comprises at least one control entity adapted to initiate the exchange of signaling information with the user equipment. The control entity may send the signaling information or the signaling is performed via further nodes in the communication network. It is also possible that the control entity instructs further nodes to perform the signaling. The control entity initiates a second signaling to the user equipment in which the user equipment receives a specification of the packet marking. The second signaling may be performed before, after or simultaneously to the first signaling. When the second signaling is received by the user equipment, the signaled packet marking is forwarded to the packet marking entity and the data packet from the application is marked with the signaled packet marking. The marking can for example be sent to the application which can forward it to the packet marking entity. Preferably, the packet marking entity stores the marking for marking a plurality of data packets from the application.

The packet marking signaled in the second signaling corresponds to the filter parameters in the first signaling. In this way, the data packet with the marking corresponding to the filter parameters is forwarded to the associated packet bearer and transmitted accordingly.

The proposed method allows a simple and flexible association of data packets to packet bearers which does not require a prior configuration of the association and can be established at the initiation of a data session. The proposed method provides a controlled way for the communication network, i.e., operator of the network, for mapping data packets onto bearers in the uplink from the user equipment to a communication entity. In addition, the method enables access agnostic application development, i.e., applications can be developed independently of the access network to which the user equipment is connected. This simplifies the development of applications making the development less expensive. If the packet marking is forwarded by the application, it can be set through the socket API. The method does not introduce new dedicated signals to install the uplink packet filters but reuses existing procedures for this purpose and can accordingly easily be implemented in existing communication networks.

In a preferable embodiment, the setup of the packet bearer is initiated by a request from a node in the communication network. This allows an improved control of the network operator over the transmission by the user equipment. Preferably, the packet bearer is selected from a group comprising at least two bearers differing in at least one associated item from a group comprising a quality of service, a charging tariff and an access point to which the packet is forwarded. Accordingly, the bearers can provide a different quality of service or may be charged differently or both.

The bearers can also or alternatively be used to forward the data packets to the correct destination, especially if the destination address in the data packet is not unique. For example, two nodes in two separate external networks may have the same IP address, i.e. different external networks can have overlapping IP address spaces. In the communication network, identical destination addresses can be distinguished by an Access Point Name (APN), which is a logical name referring to an edge node interfacing the external network, e.g. a GGSN. An edge node may be connected to multiple external networks, each being identified by a different APN. By associating the bearer with the APN of the access point, the packet filter can forward packets with identical destination addresses to the associated bearer and thus to the correct external network and ultimately to the intended destination. Thus the proposed method provides an easy way of separating traffic for different networks, even if they have overlapping addresses, since the packet filter scans the packet marking which is in turn associated to the APN.

In many cases the executing unit and the transmission unit are embodied in the same device, for example in a mobile phone. The units can be logically distinct, i.e. they may have a specified interface like for example a mobile terminal and a terminal equipment according to 3GPP specifications. It is also possible that the user equipment comprises physically distinct devices, e.g. the transmission unit may be a UMTS card or a mobile phone while the executing unit is part of another device connectable to the transmission unit, for example a computer or television set with a wired or wireless connection to the transmission unit. Communication networks typically comprise a plurality of control entities. In an advantageous embodiment, the communication network comprises at least two control entities and a first of said entities initiates the first signaling and a second of said entities initiates the second signaling. As the first and second signaling have different receiving entities in the user equipment and will generally also be performed using different signaling protocols it is often not suitable to have single control entity for the signaling. If two or more control entities exist, the association of the first and second signaling can be defined by messages between the entities and/or operator configuration.

Preferably, the second signaling is performed using a session protocol which is for example based on the IP protocol. Suitable protocols are for example the session description protocol/session initiation protocol (SDP/SIP). The protocols are preferably adapted to transport the specification of the packet marking, e.g. a DSCP.

In an advantageous embodiment, the data packet is an internet protocol (IP) data packet and the control field is the differentiated services field or the type of service field in the header of the data packet. In this case, a suitable packet marking is the DSCP. This allows an easy implementation of the method in existing networks.

In a preferable embodiment, the filter parameters comprise both the signaled packet marking and at least one further parameter of the data packet. In this way a finer granularity of the mapping between data packets and bearer may be achieved. For example, the packet filter may also evaluate further fields in the packet header, e.g. the source or destination address, the source or destination port number or the protocol identification or any combination of such parameters. This embodiment allows it for example to set up different bearers for packets of different protocols or with different destinations if the packets are destined for different APNs and shall be transmitted with different quality of service or different charging. Any combination of such parameters is possible.

Preferably, the application is adapted to receive the second signaling and to initiate the packet marking by the marking entity. The application can for example receive the signaling with the packet marking and instruct a corresponding marking of the data packets through the socket API to the packet marking entity. This allows an easy implementation of the second signaling.

Especially if the application is involved in the signaling, it is important to ensure backward compatibility because not all user equipments and/or applications may be adapted to handle the signals comprising the packet marking. Therefore, an advantageous user equipment sends a reply message for the second signaling to the control entity. The reply message indicates whether the user equipment or the application are adapted to handle the packet marking. Preferably, the reply message comprises a confirmation, e.g. an acknowledgement, for the packet marking. In this way, a missing confirmation indicates that the user equipment or the application is not adapted to perform the proposed method. Thus, backward compatibility for applications that do not support packet marking is ensured by introducing an explicit signal from the user equipment that indicates support for the packet marking, e.g. a DSCP-binding.

In case that the reply message indicates that the user equipment is not adapted to perform the method, a preferable control entity initiates a modification of the packet filter according to the reply message. Especially if the filter is not yet established when the reply message is received, the filter is selected according to the reply message. For example, the filter may be removed or a filter with different filter parameters can be introduced which does not scan the packet marking. Instead, the packet filter may check other parameters of the data packets. In this way, the network can adapt the packet filter installed in the user equipment.

An advantageous communication network is adapted to perform any embodiment of the method as described above.

A preferable control entity for a communication network is adapted to initiate the association of a data packet with a packet bearer in a user equipment of the communication network. The packet bearer is adapted to transmit the data packet to a communication entity in the communication network. The user equipment comprises at least one executing unit for executing one or more applications which create the data packet, a packet marking entity for marking at least one control field in the data packet and a transmission unit for setting up the packet bearer to the communication entity and for sending the data packet on the packet bearer. The proposed control entity comprises an input/output unit to initiate an exchange of signaling information with the user equipment. The signaling can be sent by the control entity and is typically performed via further nodes in the communication network. It is also possible that the control entity instructs further nodes to perform the signaling.

A processing unit initiates a first signaling to the user equipment via the input/output unit. The first signaling conveys filter parameters for defining a packet filter. The filter parameters correspond at least to a packet marking. The first signaling initiates the establishment of the packet filter corresponding to the filter parameters for scanning data packets forwarded from the executing unit to the transmission unit in the user equipment, and the association of the packet filter with the packet bearer. The processing unit is furthermore adapted to initiate a second signaling of the packet marking via the input/output unit to the user equipment to initiate a marking of the data packet with the signaled packet marking. The first and second signaling may be performed in any order in time with respect to each other.

An advantageous user equipment for a communication network is adapted to associate a data packet with a packet bearer being adapted to transmit the data packet to a communication entity in the communication network. The communication network comprises at least one control entity adapted to exchange signaling information with the user equipment. The proposed user equipment comprises an executing unit for executing one or more applications which create the data packet. A transmission unit is adapted to establish the packet bearer with the communication entity and to send the data packet on the packet bearer. The initiation and/or control of the establishment procedure can either be performed in the user equipment or in a node of the communication network.

A first receiving unit is adapted to receive a first signaling of filter parameters for defining a packet filter, the filter parameters corresponding to a packet marking and a second receiving unit to receive a second signaling of the packet marking from the control entity. The first and second receiving unit may be identical. It is also possible that one of the receiving units forwards signaling messages to the other receiving unit. The receiving units may be integrated with the transmission unit in a transceiver.

A packet marking entity in the user equipment is adapted to receive the signaled packet marking from the receiving unit and to mark at least one control field in the data packet with the signaled packet marking. A packet filter corresponding to the filter parameters is adapted to scan data packets forwarded from the executing unit to the transmission unit. The packet filter is associated with the packet bearer and forwards data packets with a marking corresponding to the filter parameters on the associated packet bearer.

The invention can also be embodied in a software program comprising code for performing the steps of a method relating to the device in which the program is executed. The program according to the invention is for example stored on a data carrier or loadable into a processing unit of a user equipment or a control device, e.g. as a sequence of signals.

The control entity, the user equipment and the software program can be adapted to any embodiment of the method described above.

The foregoing and other objects, features and advantages of the present invention will become more apparent in the following detailed description of preferred embodiments as illustrated in the accompanying drawings.

DETAILED DESCRIPTION OF PREFERRED EMBODIMENTS

Figure 1:
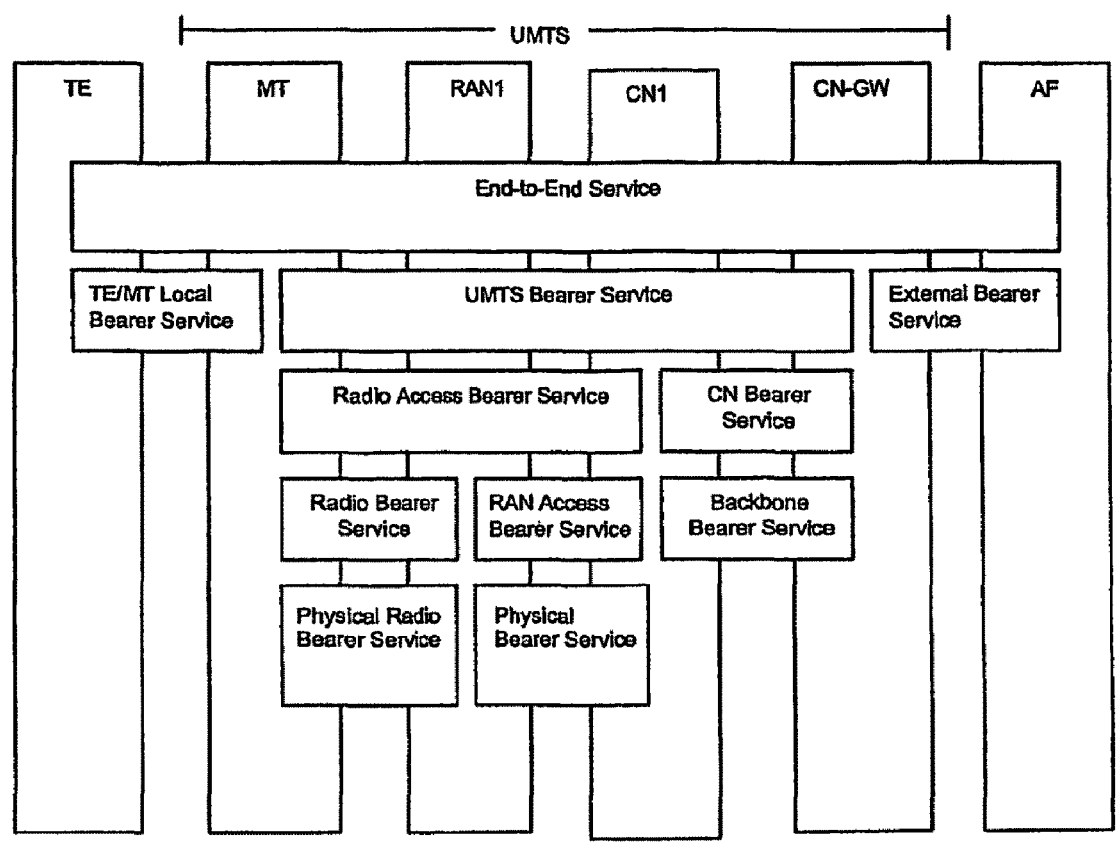
FIG. 1 shows an architecture for providing a defined quality of service in a mobile system.

FIG. 1 illustrates a quality of service concept in $3^{rd}$ generation mobile systems as specified in technical specification 3GPP 23.107 V 6.3.0. of the $3^{rd}$ Generation Partnership Project. Traffic comprising data packets is sent between an entity (AF) and a user equipment comprising a terminal equipment (TE) and a mobile terminal (MT). The entity (AF) may be a server which could be located in the operator's network or in an external network but it can be also another user equipment. The object of the concept is to provide a defined quality of service (QoS) on the application level using the bearer services of the underlying levels. Those bearer services are specified by contexts comprising attributes for defining the QoS of the respective bearer service. As the quality of the end-to-end service on the application layer depends on the specifications of the underlying levels, the contexts of the bearer services need to be specified with respect to the required end-to-end quality of service.

The TE/MT local bearer service forwards the data packets within the user equipment between the terminal equipment (TE) and the mobile terminal (MT). Accordingly, terminal equipment (TE) and the mobile terminal (MT) may be part of a single device or may be embodied in different device in communication via the TE/MT local bearer service. The data packets are received or sent over a radio link with the radio access network (RAN1) of the mobile network. The External Bearer Service is provided by another network which can also be a UMTS (Universal Mobile Telephony System) network, i.e. a network according to 3GPP specifications, another mobile network or a fixed network like a fixed communication system such as the Internet. The external bearer forwards data packets between the entity (AF) and an edge node (CN-GW) of the core network of the mobile network.

The core network comprises also a core network node (CN1) which controls the forwarding of packets between core network and radio access network (RAN1). Edge node (CN-GW) and core network node (CN1) can be the same node. The data packet traffic through the mobile network is sent over a Radio Access Bearer Service between mobile terminal (MT) and core network node (CN1) and over a Core Network Bearer Service between Gateway node (CN-GW) and core network node (CN1). These Services are in turn provided by a Radio Bearer Service on the radio link between user equipment and radio access network (RAN1), a RAN Access Bearer Service between radio access network (RAN1) and core network node (CN1) and a Backbone Bearer Service within the core network. Ultimately, all services depend on different physical bearer services on the respective links, i.e. typically a plurality of contexts and services relate to individual links in a transmission.

Figure 2:
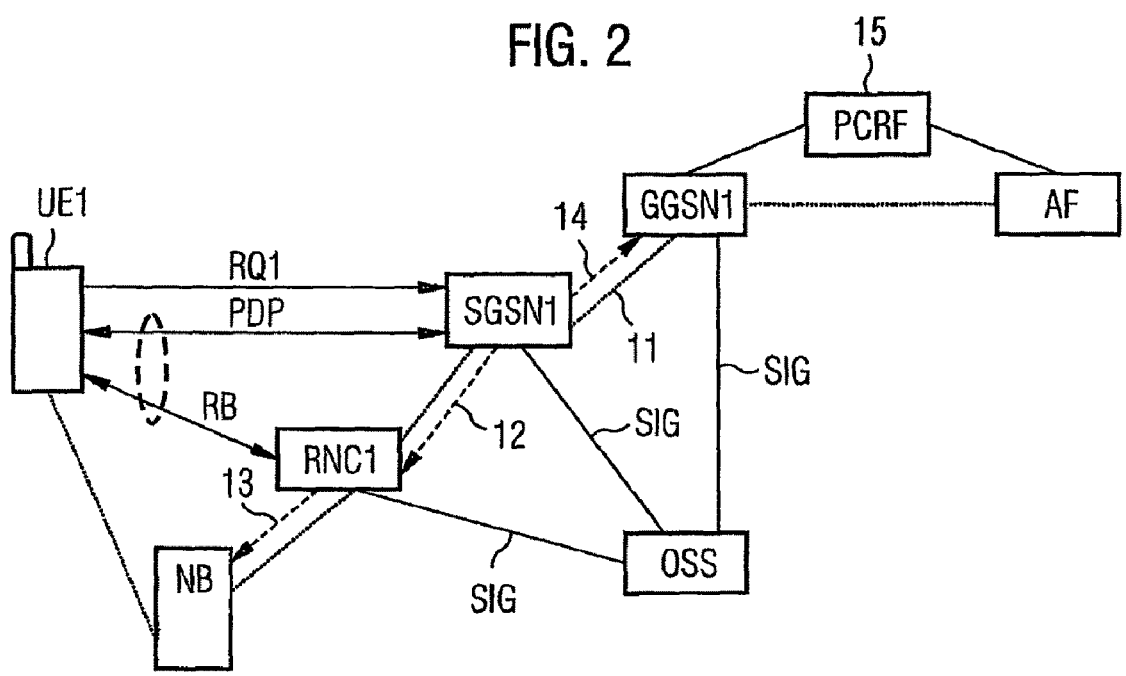
FIG. 2 shows the cooperation of nodes in a mobile system in which the invention is embodied.

FIG. 2 shows an example of a transmission of data packets using the proposed method with involved contexts and nodes. For the transmission of the data packets, a PDP context (PDP) is negotiated between the user equipment (UE1) and a core network node, here an SGSN (SGSN1). The transmission is later performed between core network node and access node or at least controlled by them. The dotted line 11 indicates a possible way on which the packets are forwarded in up-link and down-link direction between the user equipment (UE) and the other entity (AF). A control entity (PCRF) interfaces a GGSN (GGSN1) as edge node and the other entity (AF).

The set up of the PDP context can for example be initiated by a corresponding request (RQ1) from the user equipment to the SGSN. It is also possible that the network (e.g., the GGSN) requests the set up of the PDP context (PDP), for example by a message to the user equipment which then initiates the sending of a request (RQ1) to activate a PDP context.

The PDP context comprises attributes which define the quality of service for the packet transmission. The establishment of a radio bearer (RB) is typically included in the establishment of a PDP context. For that purpose, the SGSN (SGSN1) sends a request (12) for establishment of a radio bearer (RB) to an access node, in the example an RNC (RNC1). The transmission of the data packets on the radio link to the user equipment is for example performed by a node B (NB) which is controlled by the RNC using radio resource control signaling (13). It is also possible to integrate the functionality of the node B and the RNC in a single node. The SGSN sends also a request (14) to an edge node of the core network, here a GGSN (GGSN1), for the establishment of a core network bearer. The configuration of the different nodes can be performed from an operation support system (OSS) over signaling links (SIG).

Figure 3:
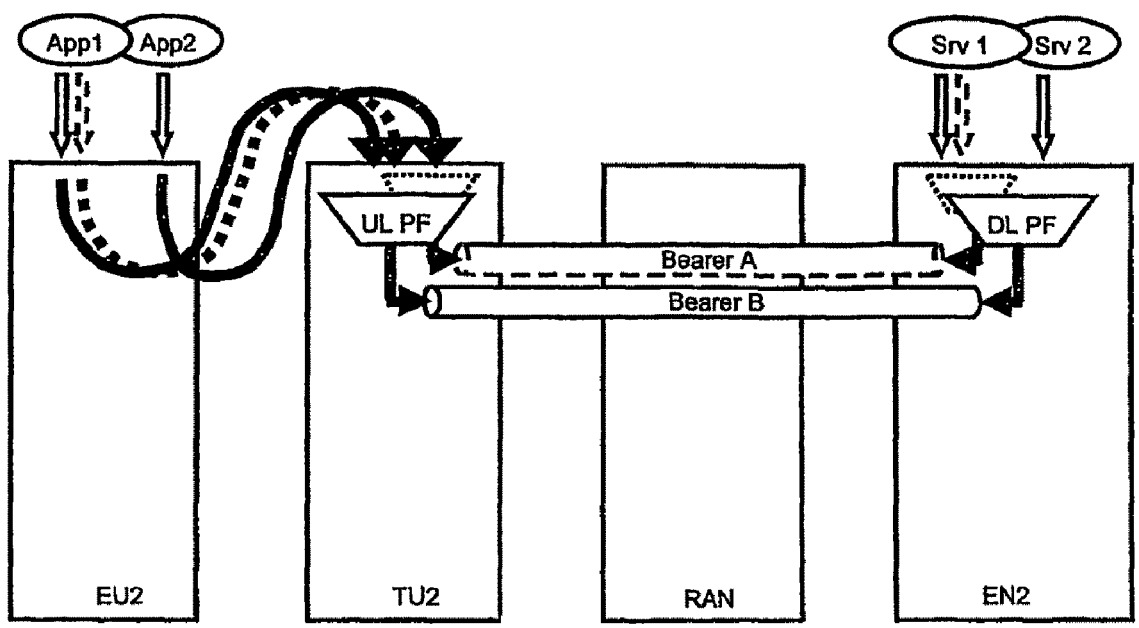
FIG. 3 shows devices performing the method for associating data packets to bearers.

FIG. 3 illustrates the basic concept of the proposed method for the example of a UMTS network. In the network, a GGSN as edge node (EN2) and a Radio Access Network (RAN)

provide two bearers with different characteristics denoted Bearer A and Bearer B. The bearers may differ in many different ways. Two examples of the characteristics could be the QoS associated to the bearers or the charging policy associated to data packets transmitted over the bearer. The GGSN comprises down link packet filters (DL PF) which map packet flows generated by different services onto the bearers. To indicate the association of packet filters and bearers, both are indicated by broken lines for bearer A while bearer B and the associated filters are indicated in continuous lines.

In the example, service (Srv1) generates two application flows, and service (Srv2) generates one application flow which are mapped onto the bearers by the down link packet filters (DL PF). The data packets originating from the services require different bearers and are accordingly also indicated in broken and continuous lines, corresponding to the bearer to which they are forwarded by the down link packet filters (DL PF).

Two applications (App1, App2) are executed in the user equipment (UE2) which consists of a personal computer as executing unit (EU2) and a mobile phone as transmission unit (TU2). Application App1 generates two data packet flows with characteristics which demand different treatment in the network. This is again indicated by broken and continuous outlines corresponding to the outlines of the bearer which shall be used. Examples of applications which generate a plurality of packet flows are multimedia and presence applications which combine e.g. a voice over IP service with other services such as video, chat, whiteboard and file sharing. Application App2 generates only a single data packet flow.

The proposed method provides a mechanism for a mapping between the data packet flows and the bearers. Although the example describes a split user equipment with distinct devices the method is also applicable if the applications are executed on a device comprising both the executing unit and the transmission unit.

The executing unit marks the data packets of the different application flows. In the example, this is achieved by the network instructing the executing unit to mark the different application flows with a particular DSCP through application-layer signaling using, e.g., SIP/SDP. Communicating the packet marking through SIP/SDP is one possibility. If the ability to communicate DSCP is added to SDP, other SDP-based protocols such as RTSP will also benefit. Generally, the functionality of signaling a packet marking could be added to any session-level protocol.

UL Packet Filters (UL PF) are established in the transmission unit and provide a mapping of marked packets onto the different bearers to which the filters are associated. In the proposed solution, this is achieved by the network installing filters as a part of the session management protocol procedures, e.g., the PDP context setup or modification. The filters use the packet marking, e.g. the DSCP as one parameter for the mapping of packets onto the bearers. It is possible that other parameters in addition to the packet marking are checked in the packet filters. In addition to filtering checking the DSCP, further filtering can be based on other parameters, e.g. the source or destination address, the source or destination port number or the protocol identification or any combination of such parameters. This enables a finer granularity of the mapping.

Figure 4:
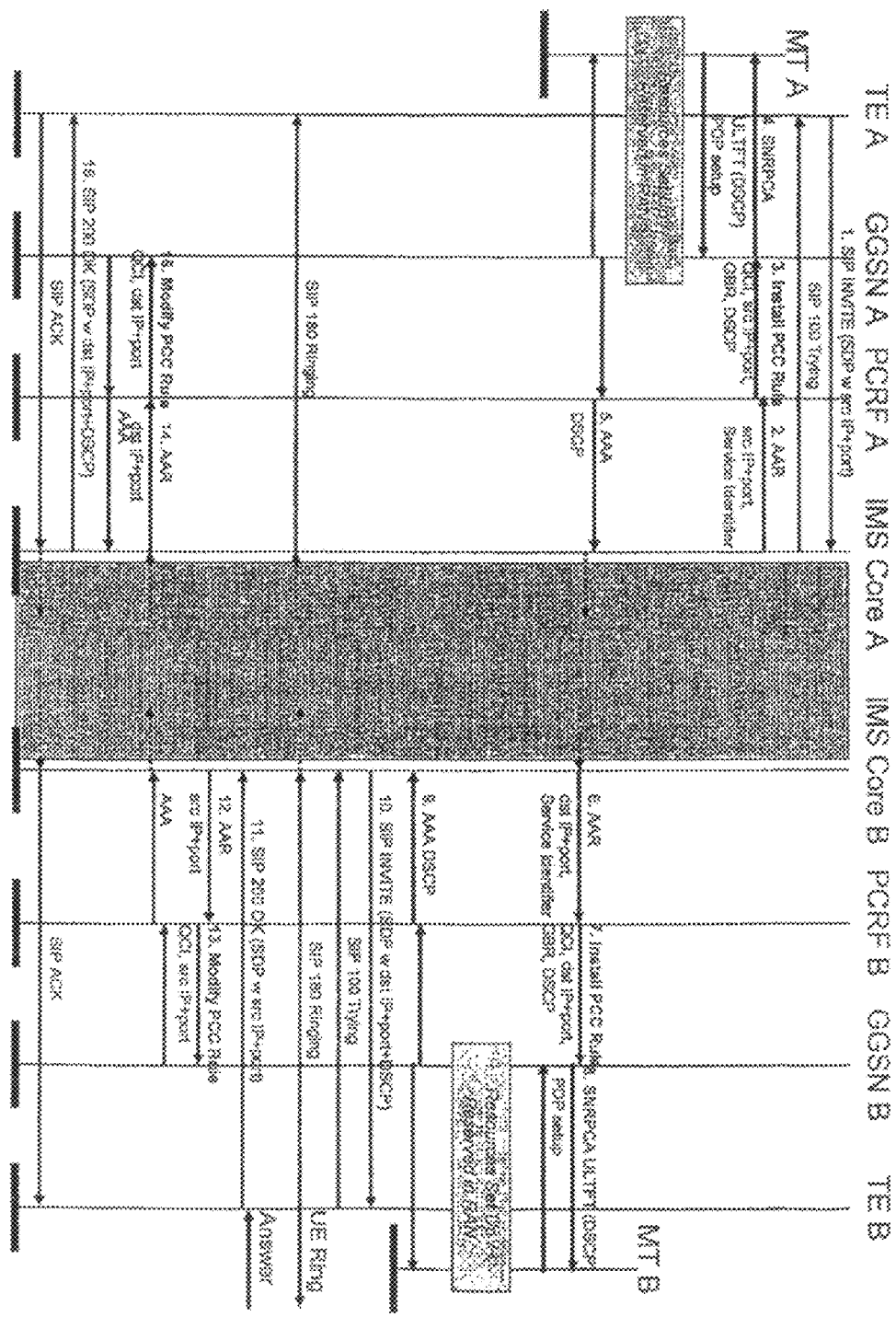
FIG. 4 shows a signaling diagram for implementing the proposed method.

FIG. 4 shows a signaling sequence for installing a packet filter in a user equipment during the setting up of a SIP based session in a 3GPP communication network. It is assumed that the PDP context used to carry the SIP signaling is already established when the session is initiated. The preceding signaling for setting up this PDP context is therefore not shown. The PDP context can for example be set up according to a request from the network, e.g. a Secondary Network Requested PDP Context Activation (SNRPCA). Correspondingly, SNRPCA signaling can be used to install the packet filters in the user equipment.

In the example of FIG. 4, the session is set up between an originating and a terminating mobile user equipment, both connected to a 3GPP network. The originating and terminating network may be connected by one or more intermediate networks which are indicated by a grey rectangle and which forward the signaling between the networks. Aspects of the signaling sequence may be changed, e.g. according to future standardization of the messages. SIP/SDP signaling is used to instruct the executing unit in both user equipments, here an IMS (IP Multimedia Subsystem) Client, to perform a packet marking. In the example, IP-packets are marked with a DSCP according to the signaling.

Both user equipments comprise a mobile terminal (MT A, MT B) as transmission unit and a terminal equipment (TE A, TE B) as executing unit. A Gateway GPRS Support Node (GGSN A, GGSN B) is the edge node of the mobile core network in the example. SIP signaling is forwarded and inspected by a node designated as IMS Core A, IMS Core B. In a typical 3GPP network, this can be the P-CSCF (Proxy-Call State Control Function). Policies, e.g. for admission control, and charging rules defined by the operator are enforced by a Policy and Charging Rules Function (PCRF A, PCRF B) as control entity.

The following signaling messages are sent in the diagram:
1. Terminal equipment TE A sends a SIP INVITE message to the node IMS Core A. The SDP parameters in the message contain the IP address and port number for the A side of the session.
2. IMS Core A sends an AAR (Authorization Authentication Request) message to control entity PCRF A, containing the IP address and port number for the A side of the session and a service identifier identifying the invoked service to the control entity PCRF.
3. Control entity PCRF A sends an "Install PCC Rule" message to edge node GGSN A indicating which QoS level, denoted QCI in FIG. 4, should be used for the bearer to carry data packets from this service. The PCRF includes the DSCP as packet marking which shall be installed in a packet filter in mobile terminal MT A. In the message, the PCRF can further include the IP address and port number for the A side of the session, which can be used for gating control in the core network, and a GBR (Guaranteed Bit-Rate) value which can be used to carry out admission control in the access network.
4. An SNRPCA message is sent by GGSN A. The SNRPCA procedure initiates the establishment of a bearer with the indicated QoS level. In the present method, the procedure is also used to install the packet filter, i.e. the SNRPCA message is the first signaling comprising also an indication of the filter parameters (ULTFT). The packet filter checks at least the packet marking, i.e. the DSCP determined by the PCRF, but it may also check other parameters. The SNRPCA message can further trigger internal procedures in the radio access network for setting up and reserving resources for the session, e.g. setting up a RAB (Radio Access Bearer) and performing admission control.
5. Control entity PCRF A sends a AAA (Authorization Authentication Answer) message to node IMS Core A indicating the DSCP that the IMS client in TE A should mark IP packets with for the media flow that is initiated. This is the DSCP sent to the GGSN A in message 3. Upon the reception of message 5, the SIP INVITE of message is forwarded to node IMS Core B. Node IMS Core A stores the DSCP value for later amendment to message 16.

6. Upon reception of the SIP INVITE, Node IMS Core B sends an AAR message to control entity PCRF B in the network of the terminating user equipment, also containing the IP address and port number of the originating side of the session and a Service Identifier, with which the PCRF can identify the invoked service.

7. Control entity PCRF B sends an "Install PCC Rule" message to edge node GGSN B of the terminating side indicating which QoS level shall be used for the bearer to carry packets from this service. The PCRF includes a second indication of a packet marking, e.g. a DSCP, which shall be installed in the packet filter of mobile terminal MT B. Depending on the policies of the respective operators, the packet markings used on the originating and terminating side of the session may either be identical or different. In the message, the PCRF can further include the IP address and port number for the A side of the session, which can be used for gating control in the core network, and a GBR (Guaranteed Bit-Rate) value which can be used to carry out admission control in the access network.

8. An SNRPCA message is sent by GGSN B. The SNRPCA procedure initiates the establishment of a bearer with the indicated QoS level. In the present method, the procedure is also used to install the packet filter, i.e. the SNRPCA message comprises also an indication of the filter parameters (ULTFT). The packet filter checks at least the packet marking, i.e. the DSCP determined by the PCRF, but it may also check other parameters. The SNRPCA message can further trigger internal procedures in the terminating radio access network for setting up and reserving resources for the session, e.g. setting up a RAB (Radio Access Bearer) and performing admission control.

9. Control entity PCRF B sends a AAA (Authorization Authentication Answer) message to node IMS Core B indicating the DSCP that the IMS client in TE B should mark IP packets with for the media flow that is initiated. This corresponds to the DSCP sent to the GGSN B in message 7.

10. Node IMS Core B forwards the SIP INVITE message received via node IMS Core A to terminal equipment TE B. The SDP parameters in the message contain the IP address and port number for the originating side of the session. The parameters are further amended with the DSCP value that was sent to IMS Core B in message 9. The IMS client in terminal equipment TE B subsequently marks IP packets of the media flow that is initiated with this DSCP value. If the session establishment requires a confirmation from the user, e.g. if it is a voice call, the IMS client in TE B triggers a user alarm, e.g. a ring tone.

11. After confirmation of the establishment by the user of the terminating user equipment, a SIP 200 OK message from terminal equipment to TE B to node IMS Core B confirms the session establishment. This message contains IP address and port number of the B side of the session and is stored.

12. Node IMS Core B sends an MR message to control entity PCRF B, containing the IP address and port number of the B side of the session.

13. Control entity PCRF B message sends a message "Modify PCC Rule" to edge node GGSN B, the message containing the IP address and port number of the B side of the session and the quality of service to be used for the session. This information is used at the edge node GGSN B to perform gating control and filtering of incoming packets. The terminating control entity then sends a confirmation of the successful execution of these procedures to the node IMS Core B. Upon reception of this confirmation, node IMS Core B forwards the SIP 200 OK message to node IMS Core A via the optional intermediate network.

14. Node IMS Core A sends an MR message to originating control entity PCRF A, containing the IP address and port number for the B side of the session.

15. Control entity PCRF A sends a "Modify PCC Rule" message to edge node GGSN A containing the IP address and port number of the B side of the session as well as an indication of the quality of service to be used for originating side of the session. This information is used at the GGSN to perform gating control and filtering of incoming data packets. Depending on the policies of the respective operators, the quality of service used on the originating and terminating side of the session may either be identical or different.

16. Node IMS Core A forwards message SIP 200 OK to terminal equipment TE A. The SDP parameters in this message contain the IP address and port number of the B side in the session. The parameters further contain the DSCP value which was sent as packet marking to node IMS Core A in message 5. The IMS client in terminal equipment TE A subsequently marks the IP packets of the initiated media flow with this DSCP value.

Finally, an acknowledgement for the successful set up of the session is sent between the involved user equipments. In this way, the information required to execute the proposed method and to enable a mapping of data packets onto bearers is exchanged between the involved entities. In contrast to customary application, e.g. SIP, signaling sent end-to-end without modification between the involved user equipments, messages in the above sequence are amended with the packet marking (here messages 9 and 16). Accordingly, existing messages to the involved user equipments are modified to the second signaling of the method.

The packet marking can relate to a variety of associations for the marked packets. For example, the DSCP as defined in the IP protocol allows 64 different code points. The markings could be used for example to map packets onto bearers with different QCI (QoS Class Identifier), each having different QoS characteristics. In addition, the packets can be mapped to different APNs or charged differently. Combinations are also possible. In an example, an operator can use the DSCP to encode both an APN and a QCI. The operator has 10 APNs each providing services which can be mapped onto 6 different QoS classes. Then a DSCP value of 0-5 can indicate a QCI value of 1-6, respectively, for a first APN, 6-11 a QCI value of 1-6, respectively, for a second APN and so on, i.e. each packet marking corresponds to a unique combination of a QoS and an APN.

The above method can also be executed for other access networks apart from the 3GPP-network in the above example because the signaling of the packet marking by SIP/SDP or any other application layer signaling protocol is access agnostic. Only the signaling used for the installation of the uplink packet filter needs to be adapted to the different access network. For example, the DHCP protocol (Dynamic Host Configuration Protocol) allows sending configuration information to hosts in an IP network. An option known as DHCP Option 121 in a DHCP signaling from a server to a DHCP Client allows to configure a list of static routes in the client. A static route is equivalent to a packet filter which defines the next IP hop for an incoming IP packet based on the destination IP address and in this way associates it to a packet bearer. Correspondingly, one option of installing a packet filter in a user equipment can be based on DHCP. For this purpose, DHCP Option 121 can be amended to transport the packet marking, e.g. the DSCP, as filter parameter and the transmission unit evaluates the corresponding parameter to establish the packet filter. The routing decision is then based on the result of the filtering, i.e. a data packet with the according marking is in this way associated to a bearer. An advantage of this option is that existing signaling procedures can be amended for this purpose.

One main advantage of the proposed method is that applications do not need to support specific procedures on the API to handle the quality of service. Any communication to lower layers is made through a standard socket API. This simplifies application development significantly. However, the executing unit must be adapted to receive the second signaling and forward the packet marking to the packet marking unit. Preferably, the applications are able to receive the packet marking, e.g. in an SIP/SDP-message, and to set the marking of a data field in the data packets, e.g. the DSCP or ToS value, using the socket API. In case that the executing unit or the application does not support this functionality, an alternative mechanism which does not require a packet marking is preferably invoked to map data packets onto the bearers.

In order to inform a control entity in the network whether the executing unit or the application is capable of packet marking, it is proposed that the executing unit sends a reply message for the second signaling. For example, an IMS client can signal the reply message to the node IMS core if DSCP marking is not supported. The reply is forwarded to the control entity of the network which can install, replace or modify the uplink packet filters according to the reply. Preferably, the absence of a reply confirming support for the packet marking is checked. In this way, an application that does not support packet marking does not need to support the reply message.

Figure 5:
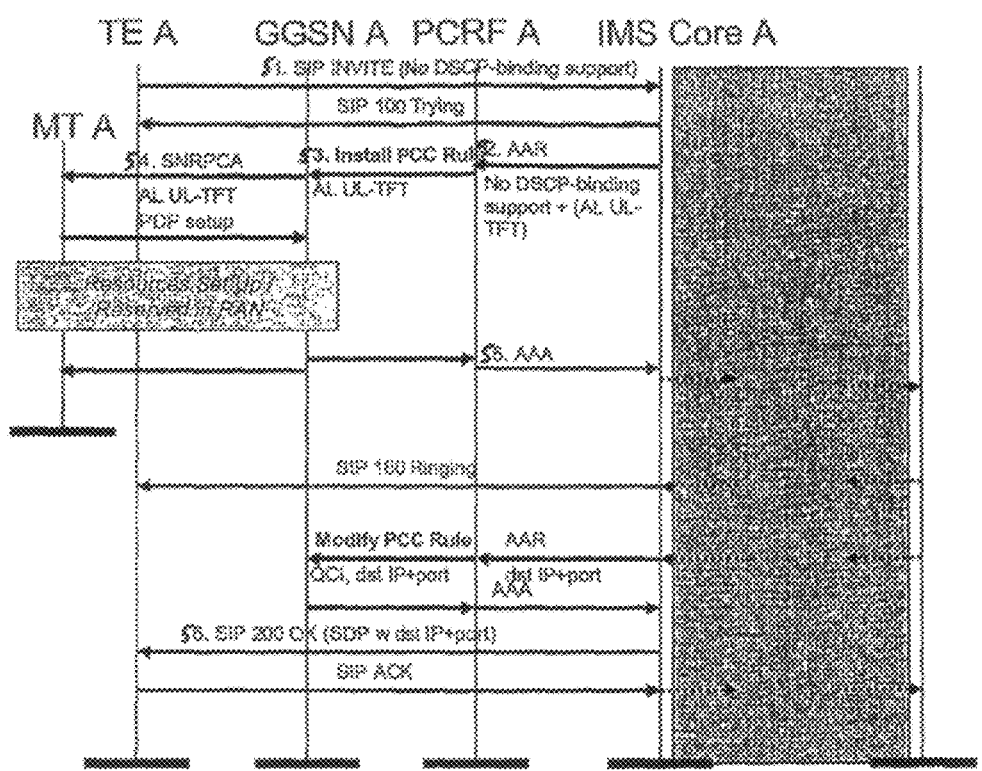
FIG. 5 shows a signaling diagram for a fall-back signaling on the originating side of a session.
Figure 6:
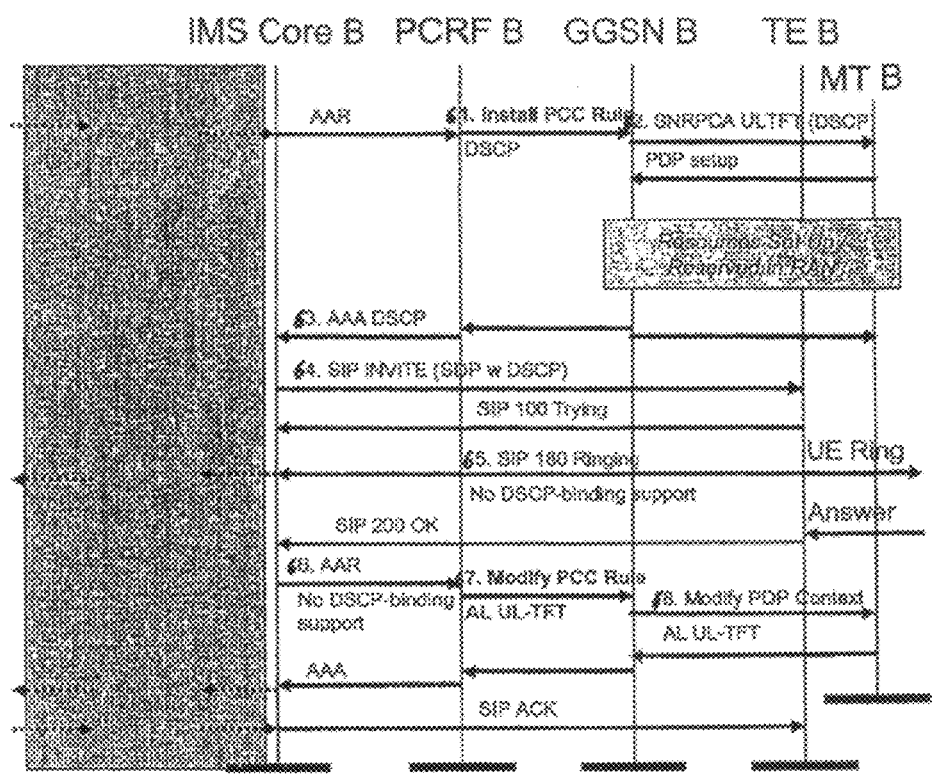
FIG. 6 shows a signaling diagram for a fall-back signaling on the terminating side of a session.

FIGS. 5 and 6 show embodiments of fall-back mechanisms on the originating side and the terminating side of a session, respectively. In the embodiments, the lack of support for packet marking by DSCP is signaled in the SIP INVITE message at the originating side and in the message "SIP 180 RINGING" at the terminating side. FIGS. 5 and 6 correspond to the originating and the terminating side of the session establishment in FIG. 4, respectively. It is possible that some applications in the terminal equipment support packet marking while others do not.

As in FIG. 4, the signaling sequence of FIG. 5 starts with a message SIP INVITE. However, in message
51. terminal equipment TEA indicates to node IMS Core A that the initiated application does not support packet marking by DSCP.
52. Node IMS Core A indicates to control entity PCRF A that terminal equipment TEA does not support packet marking by DSCP. Optionally, node IMS Core A includes parameters defining an alternative packet filter (AL UL-TFT).
53. Control entity PCRF A defines an alternative packet filter instead of the filter checking the packet marking. Optionally it forwards the parameters AL UL-TFT to edge node GGSN A.
54. Edge node GGSN A sends the signal SNRPCA indicating the alternative packet filter.

The remaining messages correspond to FIG. 4, except that messages 55 and 56 do not indicate a packet marking.

For the terminating side, FIG. 6 shows a signaling sequence implementing a fall-back mechanism. In message
61. the terminating control entity PCRF B forwards a packet marking DSCP to the terminating GGSN B.
62. The packet filter checking the packet marking is installed as described in FIG. 4.
63. Control entity PCRF B forwards the packet marking to the node IMS Core B as described in FIG. 4
64. The node IMS Core B forwards the packet marking to the terminal equipment TE B as described in FIG. 4. However, in the present example the client executed in terminal equipment TE B does not support packet marking and disregards the corresponding SDP field.
65. In message "SIP 180 Ringing", terminal equipment TE B signals to node IMS Core B that it does not support packet marking, e.g. by omitting a corresponding confirmation.
66. Node IMS Core B informs control entity PCRF B that terminal equipment TE B does not support packet marking.
67. Control entity PCRF B sends information to modify the packet filter in mobile terminal MT B to the edge node GGSN B, preferably including new filter parameters (AL-UL TFT).
68. The GGSN initiates a procedure to modify the packet filter in mobile terminal MT B (Modify PDP Context).

In this way, errors in the transmission can be avoided if the user equipment does not support the proposed method. Optionally, a control entity in the communication network, e.g. the PCRF, stores whether the user equipment supports the proposed method. At the next setup of a session to the same application, the control entity checks if the application supports packet marking. In this case, an installation of an alternative packet filter can be initiated without a prior attempt to install a packet marking with corresponding filter.

Figure 7:
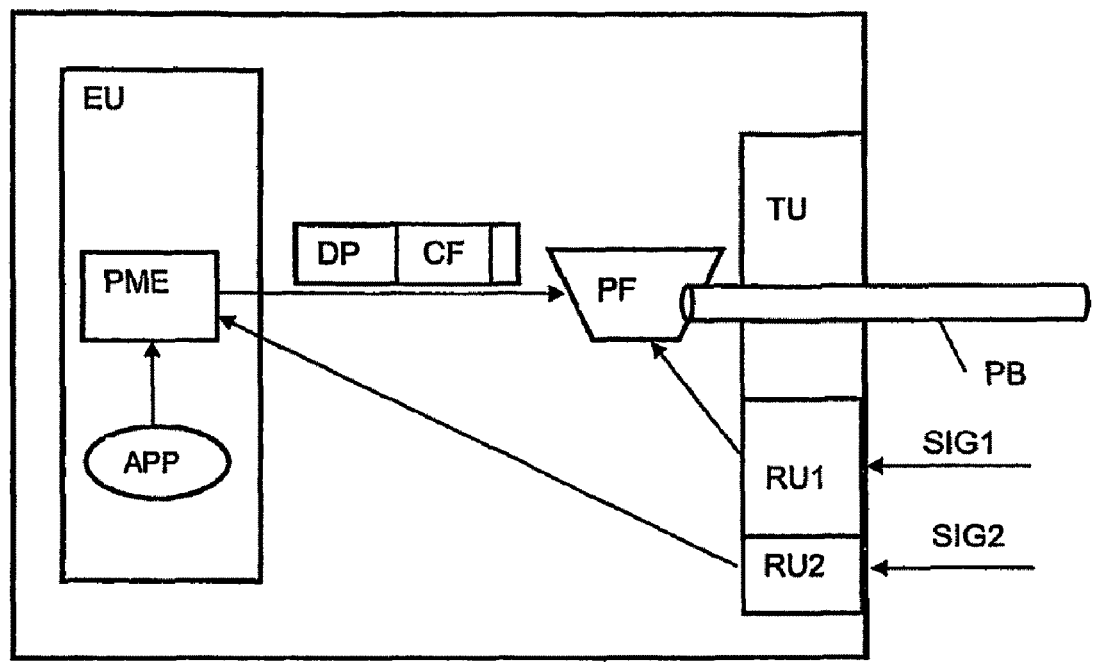
FIG. 7 shows a user equipment adapted to perform the proposed method.

FIG. 7 shows a user equipment for a communication network adapted to perform the proposed method. It has a transmission unit (TU) for setting up the packet bearer (PB) to a communication entity and sending data packets (DP) on the packet bearer. The packet bearer transmits the data packets to a communication entity in the communication network. An executing unit (EU) executes one or more applications (APP) which create data packets. A first receiving unit (RU1) is adapted to receive a first signaling (SIG1) of filter parameters for defining a packet filter (PF). The filter parameters correspond to a packet marking. A second receiving unit (RU2) is adapted to receive a second signaling (SIG2) of the packet marking from a control entity in the network.

First receiving unit (RU1) and second receiving unit (RU2) may be the same device. Both may also be integrated in a transceiver with the transmission unit (TU). If the user equipment consists of two distinct entities, one of them forwarding data and signaling to the other entity, the signaling may be received by one of the receiving units first and forwarded to the other receiving unit.

A packet marking entity (PME) receives the signaled packet marking from the second receiving unit (RU2) and marks at least one control field (CF) in the data packet (DP) with the signaled packet marking. The characteristics of the packet filter (PF) correspond to the filter parameters. It scans data packets forwarded from the executing unit to the transmission unit and is associated with the packet bearer. The packet filter (PF) forwards data packets with a marking corresponding to the filter parameters on the associated packet bearer. In this way, the data packet is associated with the packet bearer.

Figure 8:
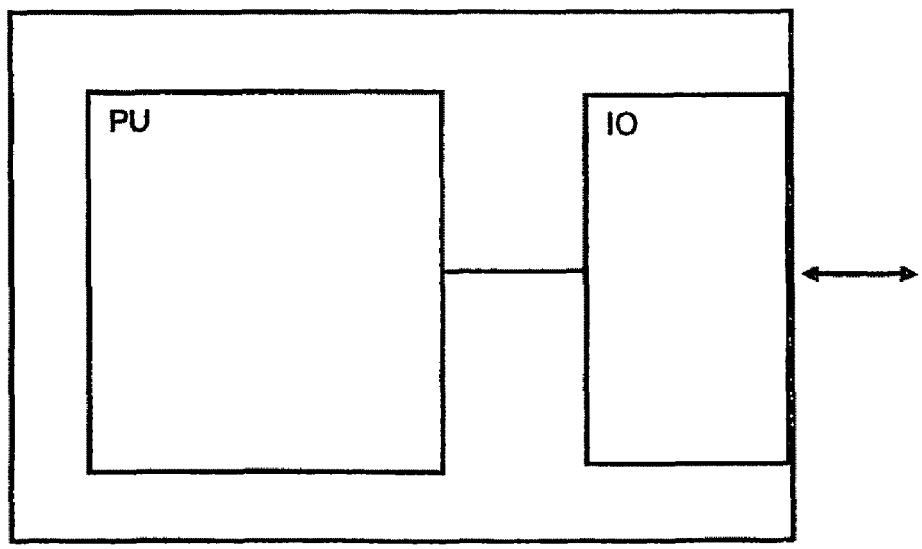
FIG. 8 shows a control entity adapted to perform the proposed method.
Figure 4:
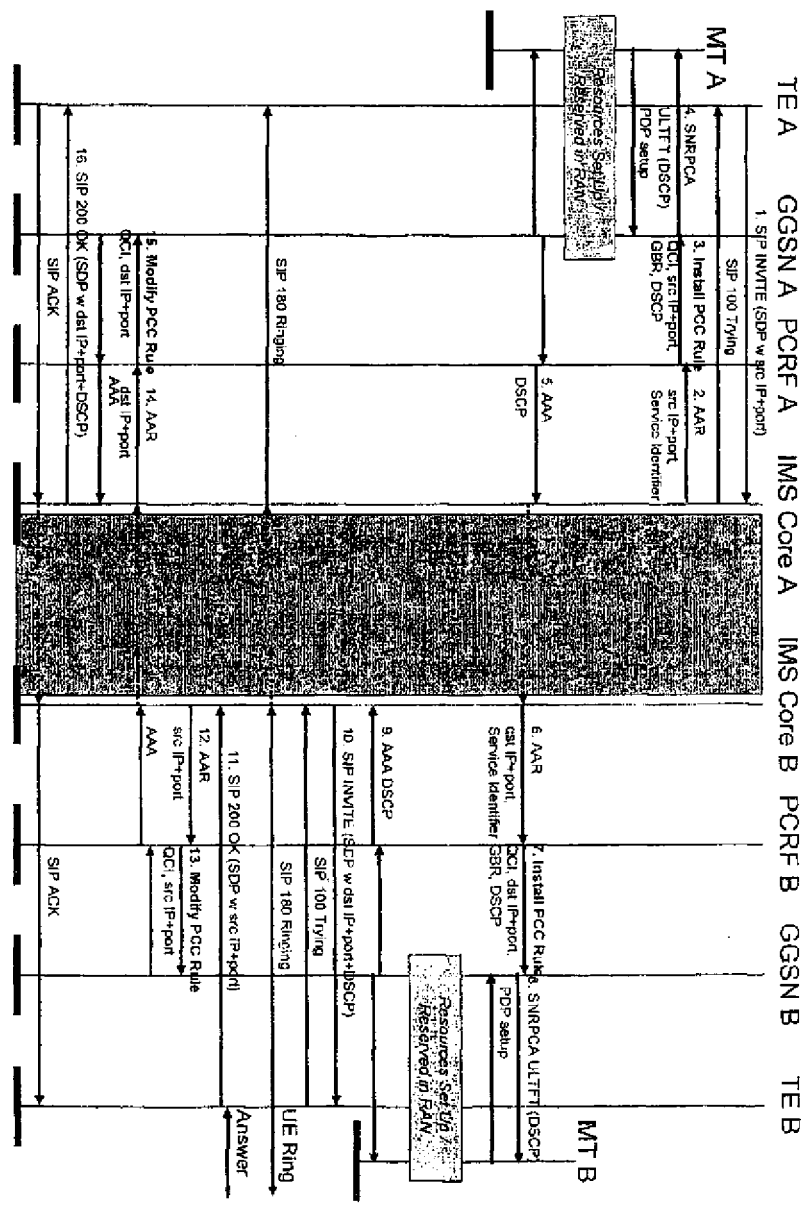
Figure 5:
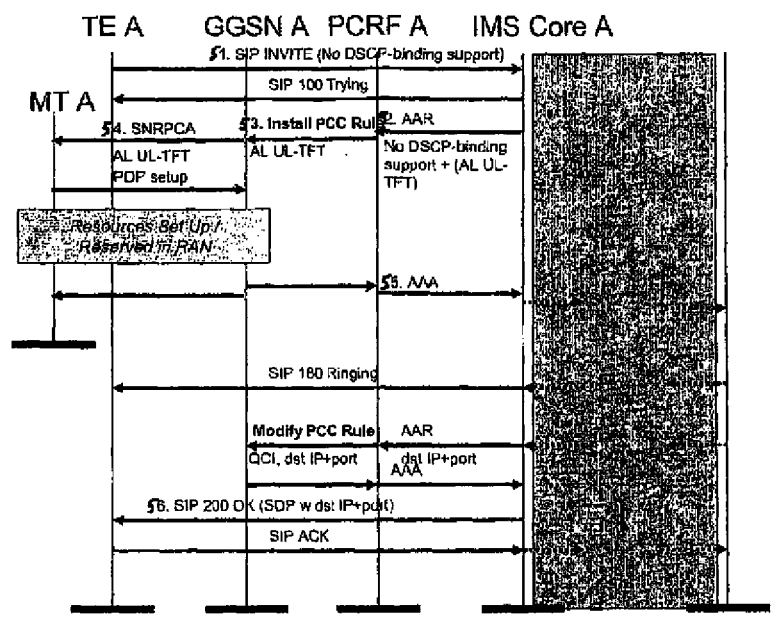
Figure 6:
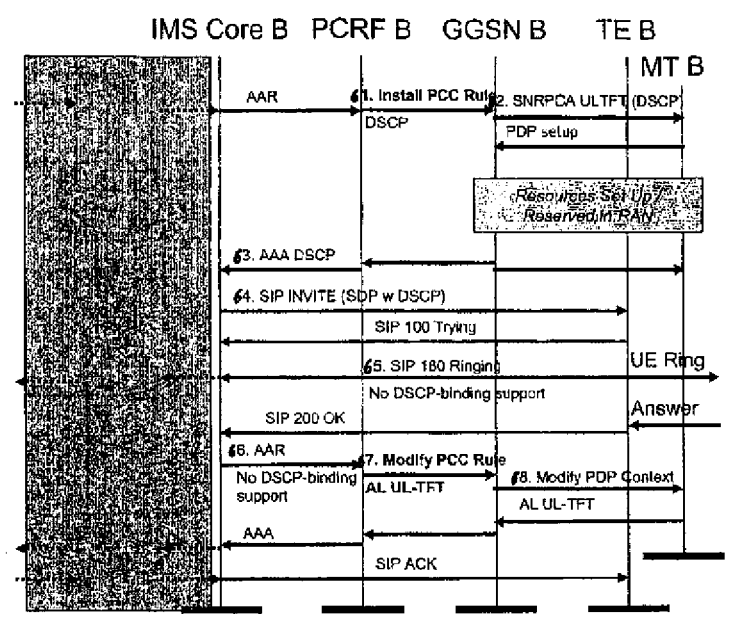

A control entity according to the invention is shown in FIG. 8. It initiates the association of a data packet with a packet bearer in a user equipment of the communication network in which the packet bearer is adapted to transmit the data packet to a communication entity. The control entity comprises an input/output unit (IO) to exchange signaling information with the user equipment. A processing unit (PU) initiates a first signaling to the user equipment of filter parameters for defining a packet filter. The filter parameters correspond to a packet marking. The first signaling initiates the establishment of a packet filter corresponding to the filter parameters for scanning data packets forwarded from the executing unit to the transmission unit in the user equipment. It also initiates the association of the packet filter with the packet bearer. Processing unit (PU) is furthermore adapted to initiate a second signaling of the packet marking to the user equipment to initiate a marking of the data packet with the signaled packet marking.

The units of the control entity and the user equipment can be embodied as electronic or optical circuitry or as software executed in such circuitry.

The above embodiments admirably achieve the objects of the invention. However, it will be appreciated that departures can be made by those skilled in the art without departing from the scope of the invention which is limited only by the claims.

The invention claimed is:

1. A method for associating a data packet with a packet bearer in a user equipment of a communication network, the packet bearer being adapted to transmit the data packet to a communication entity in the communication network, wherein the communication network comprises at least one control entity adapted to initiate an exchange of signaling information with the user equipment, and wherein the user equipment comprises at least one executing unit for executing one or more applications which create the data packet, a packet marking entity (PME) for marking at least one control field in the data packet and a transmission unit for sending the data packet on the packet bearer, the method comprising the steps of:
setting up the packet bearer between the transmission unit and the communication entity;
receiving a first signaling of filter parameters for defining a packet filter at the user equipment, the filter parameters corresponding to a packet marking,
receiving a second signaling of the packet marking at the user equipment and forwarding the signaled packet marking to the packet marking entity,
marking the data packet with the signaled packet marking;
establishing the packet filter corresponding to the filter parameters for scanning data packets forwarded from the executing unit to the transmission unit, wherein the packet filter is associated with the packet bearer; and
forwarding the data packet with the marking corresponding to the filter parameters on the associated packet bearer.

2. Method according to claim 1, wherein the setup of the packet bearer is initiated by a request from a node in the communication network.

3. Method according to claim 1, wherein the packet bearer is selected from a group comprising at least two bearers differing in at least one associated item from a group comprising a quality of service, a charging tariff and an access point to which the packet is forwarded.

4. Method according to claim 1, wherein the executing unit and the transmission unit are logically or physically distinct devices.

5. Method according to claim 1, wherein the communication network comprises at least two of the control entities and a first of said entities initiates the first signaling and a second of said entities initiates the second signaling.

6. Method according to claim 1, wherein the second signaling is performed using a session protocol.

7. Method according to claim 1, wherein the data packet is an internet protocol IP data packet and the control field is the differentiated services field or the type of service field in the header of the data packet.

8. Method according to claim 1, wherein the filter parameters comprise both the signaled packet marking and at least one further parameter of the data packet.

9. Method according to claim 1, wherein the application is adapted to receive the second signaling and to initiate the packet marking by the marking entity.

10. Method according to claim 9, wherein the user equipment sends a reply message for the second signaling to the control entity and wherein the reply message indicates whether the application is adapted to handle the packet marking.

11. Method according to claim 10, wherein the control entity initiates a modification or selection of the packet filter according to the reply message if the reply message indicates that the application is not adapted to handle the packet marking.

12. Program unit comprising code embodied in a tangible computer-readable medium for performing the steps of a method according claim 1.

13. Control entity for a communication network for initiating the association of a data packet with a packet bearer in a user equipment of the communication network, wherein the packet bearer is adapted to transmit the data packet to a communication entity in the communication network, and wherein the user equipment comprises at least one executing unit for executing one or more applications which create the data packet, a packet marking entity for marking at least one control field in the data packet and a transmission unit for setting up the packet bearer to the communication entity and for sending the data packet on the packet bearer, the control entity embodied as electronic circuitry comprising:
a processor; and
a memory, wherein the electronic circuitry enables:
an input/output unit for initiating an exchange of signaling information with the user equipment,
a processing unit to initiate a first signaling to the user equipment of filter parameters for defining a packet filter, the filter parameters corresponding to a packet marking, and for initiating the establishment of the packet filter corresponding to the filter parameters for scanning data packets forwarded from the executing unit to the transmission unit in the user equipment, and to initiate the association of the packet filter with the packet bearer, the processing unit being furthermore adapted to initiate a second signaling of the packet marking to the user equipment to initiate a marking of the data packet with the signaled packet marking.

14. User equipment for a communication network, the user equipment being adapted to associate a data packet with a packet bearer being adapted to transmit the data packet to a communication entity in the communication network, wherein the communication network comprises at least one control entity adapted to initiate an exchange of signaling information with the user equipment, the user equipment embodied as electronic circuitry comprising:
- a processor; and
- a memory, wherein the electronic circuitry enables:
  - an executing unit for executing one or more applications which create the data packet;
  - a transmission unit for establishing the packet bearer with the communication entity and sending the data packet on the packet bearer;
  - a first receiving unit for receiving a first signaling of filter parameters for defining a packet filter, the filter parameters corresponding to a packet marking;
  - a second receiving unit for receiving a second signaling of the packet marking from the control entity;
  - a packet marking entity adapted to receive the signaled packet marking from the second receiving unit and for marking at least one control field in the data packet with the signaled packet marking;
  - a packet filter corresponding to the filter parameters, the packet filter being adapted to scan data packets forwarded from the executing unit to the transmission unit, wherein the packet filter is associated with the packet bearer and to forward the data packet with the marking corresponding to the filter parameters on the associated packet bearer.

15. User equipment according to claim 14, wherein the first receiving unit is the second receiving unit.

* * * * *

UNITED STATES PATENT AND TRADEMARK OFFICE
CERTIFICATE OF CORRECTION

| | | |
|---|---|---|
| PATENT NO. | : 8,041,837 B2 | Page 1 of 1 |
| APPLICATION NO. | : 12/160545 | |
| DATED | : October 18, 2011 | |
| INVENTOR(S) | : Ekström et al. | |

It is certified that error appears in the above-identified patent and that said Letters Patent is hereby corrected as shown below:

In the specification

In Column 11, Line 65, delete "MR" and insert -- AAR --, therefor.

In Column 12, Line 13, delete "MR" and insert -- AAR --, therefor.

In Column 14, Line 5, delete "the" and insert -- The --, therefor.

In the claims

In Column 16, Line 32, in Claim 12, delete "according" and insert -- according to --, therefor.

Signed and Sealed this
Twenty-seventh Day of October, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,041,837 B2 | Page 1 of 4 |
| APPLICATION NO. | : 12/160545 | |
| DATED | : October 18, 2011 | |
| INVENTOR(S) | : Ekström et al. | |

It is certified that error appears in the above-identified patent and that said Letters Patent is hereby corrected as shown below:

In the Drawings

Replace the Figure 4 with the attach Replacement Sheet.

Replace the Figure 5 with the attach Replacement Sheet.

Replace the Figure 6 with the attach Replacement Sheet.

Signed and Sealed this
Twenty-fourth Day of November, 2015

Michelle K. Lee
*Director of the United States Patent and Trademark Office*